Patented Nov. 12, 1929

1,735,368

UNITED STATES PATENT OFFICE

JAMES C. WILLIAMS, OF DENVER, COLORADO

LUBRICANT

No Drawing.  Application filed August 31, 1926. Serial No. 132,672.

This invention relates to lubricants and its object resides in the production of a composition of matter particularly adapted for application to fractionally engaging parts such as the plates of elliptic or semi-elliptic automobile-springs.

It is a distinctive feature of the composition that one application will suffice to lubricate the parts during an extensive period of constant use, without appreciable diminution of its effective qualities.

The essential ingredients of the composition are a lubricative substance and a coherent and stiffening agent which will soften in the presence of heat. The composition as a commercial product, is a solid mass which may be adapted for use by melting it to a semi-liquid state. It is applied to machine parts to be lubricated by spreading, flowing or any other convenient method, and after it has again stiffened to its original hardness, it will adhere to the metal and retain its lubricative qualities as long as any of the material remains. It has been demonstrated in actual practise that the material applied as stated, will perform its function without renewal for many months.

The composition in its preferred form consists of paraffin, beeswax, rosin, castor oil and natural graphite. All the ingredients, with the exception of the graphite are liquefied by heating, the graphite is reduced to powder form (preferably No. 635 mesh) and all the ingredients are then thoroughly intermixed by agitation, spatulation or both.

In preparing the composition, its ingredients are intermixed preferably in the following proportions:

| | Parts |
|---|---|
| Paraffin | 37 |
| Beeswax | 20 |
| Rosin | 1 |
| Castor oil | 2 |
| Graphite | 40 |

It will be seen from the above that the graphite is the principal ingredient of the composition. The paraffin acts as a carrier to prevent separation of the other ingredients after intermixture and maintains them in a substantially uniformally distributed condition.

The beeswax and the rosin are the stiffening agents which modify the softening quality of the paraffin and which form the composition into a solid body of adhesive matter which after it has been applied in a softened state will firmly adhere to the metal. The castor oil adds to the lubricative qualities of the graphite and smooths the surfaces of the material which contact with the machine parts to which it is applied.

The proportions given hereinbefore may be varied according to the uses for which the composition is intended.

While for the purpose of my invention any natural graphite may be used, I prefer to employ structural graphite for the reason that it is more lasting and is a better lubricant.

Having thus described my invention, what I claim and desire to secure by Letters Patent is:—

A lubricant composition consisting of paraffin 37 parts, beeswax 20 parts, rosin 1 part, castor oil 2 parts, and graphite 40 parts.

In testimony whereof I have affixed my signature.

JAMES C. WILLIAMS.